United States Patent [19]
Marchok et al.

[11] Patent Number: 6,122,246
[45] Date of Patent: Sep. 19, 2000

[54] APPARATUS AND METHOD FOR CLOCK SYNCHRONIZATION IN A MULTI-POINT OFDM/DMT DIGITAL COMMUNICATIONS SYSTEM

[75] Inventors: Daniel J. Marchok, Buchanan, Mich.; Samir Kapoor; Ravi Chandran, both of South Bend, Ind.

[73] Assignee: Tellabs Operations, Inc., Lisle, Ill.

[21] Appl. No.: 08/900,312

[22] Filed: Jul. 25, 1997

Related U.S. Application Data

[63] Continuation-in-part of application No. 08/700,779, Aug. 22, 1996, Pat. No. 5,790,514, and a continuation-in-part of application No. 08/845,544, Apr. 24, 1997.

[51] Int. Cl.[7] .............................. H04M 11/06; H04B 3/10
[52] U.S. Cl. ......................... 370/208; 370/206; 370/491
[58] Field of Search .................................... 370/203, 208, 370/210, 350, 484, 485, 503, 509, 206, 70, 19, 491, 492

[56] References Cited

U.S. PATENT DOCUMENTS

| | | | |
|---|---|---|---|
| 5,471,464 | 11/1995 | Ikeda .......................................... | 370/19 |
| 5,557,612 | 9/1996 | Bingham .................................... | 370/70 |
| 5,596,582 | 1/1997 | Sato et al. ................................. | 370/509 |
| 5,610,908 | 3/1997 | Shelswell et al. ....................... | 370/210 |
| 5,682,376 | 10/1997 | Hayashino et al. ..................... | 370/206 |
| 5,774,450 | 6/1998 | Harada et al. ........................... | 370/206 |
| 5,812,523 | 9/1998 | Isaksson et al. ......................... | 370/208 |

OTHER PUBLICATIONS

"A Technique for Orthogonal Frequency Division Multiplexing Frequency Offset Correction", IEEE Transactions On Communications, vol. 42, No. 10, Oct. 1994.

*Primary Examiner*—Huy D. Vu
*Assistant Examiner*—M. Phan
*Attorney, Agent, or Firm*—McAndrews, Held & Malloy, Ltd.

[57] ABSTRACT

A multi-point communications system is set forth herein. The communications system comprises a transmitter for transmitting OFDM/DMT symbols over a predetermined number of bins across a transmission medium. The OFDM/DMT symbols are generated using at least one timing signal. At least one of the predetermined number of bins includes a pilot tone sub-symbol having a frequency corresponding to the clock signal. The communications system also includes a receiver for receiving the OFDM/DMT symbols from the transmission medium. The receiver demodulates the received symbols using at least one timing signal. The receiver has a first pilot tone search mode of operation in which the receiver adjusts its timing signal to scan the frequency range of the predetermined number of bins looking for the pilot tone sub-symbol and identifies the bin including the pilot tone sub-symbol. The receiver further has a subsequent second pilot tone acquisition mode in which the receiver adjusts the timing signal to receive the identified bin containing the pilot tone sub-symbol and measures phase differences between successive pilot tone sub-symbols to thereby perform a further adjustment of the timing signal so that the pilot tone sub-symbol is received within a frequency range sufficient for subsequent phase locked loop processing thereof.

37 Claims, 8 Drawing Sheets

FIG. 4
legend: △ PILOT
⊗ RANDOM OR DATA
○ EMPTY (ZERO POWER)
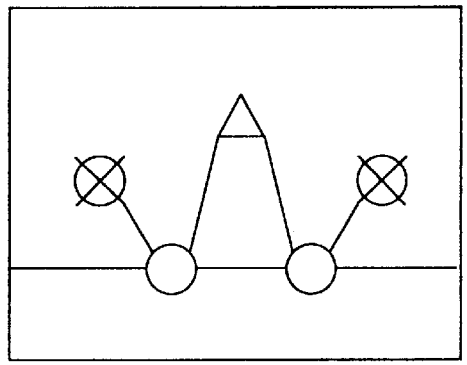
(a) 5-bin symmetric pattern
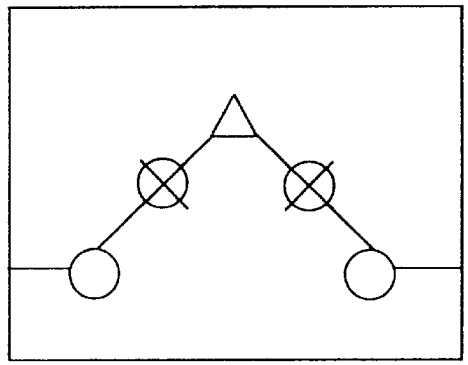
(b) 5-bin symmetric pattern
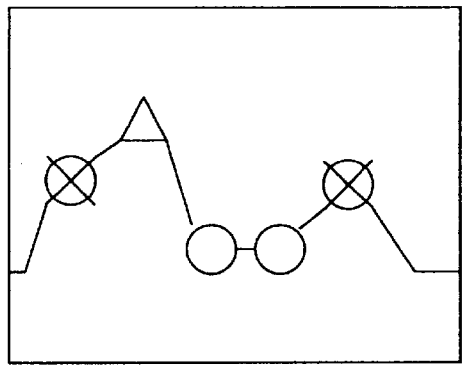
(ac) 5-bin asymmetric pattern
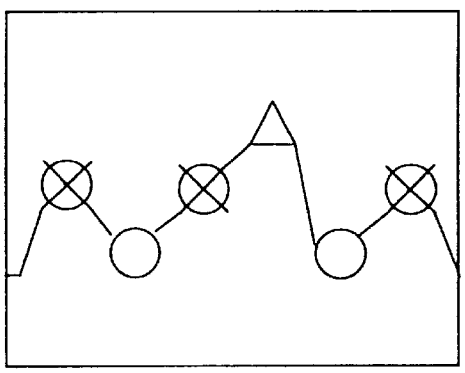
(d) 6-bin asymmetric pattern

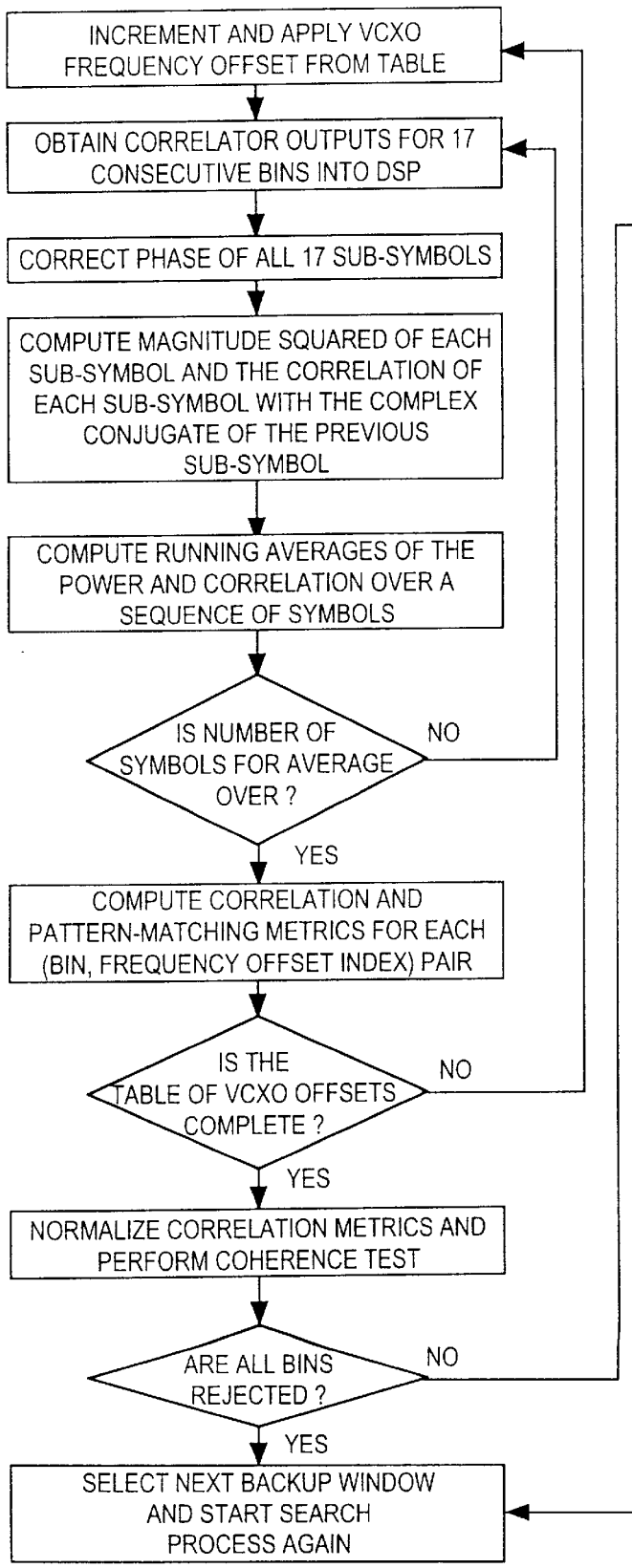
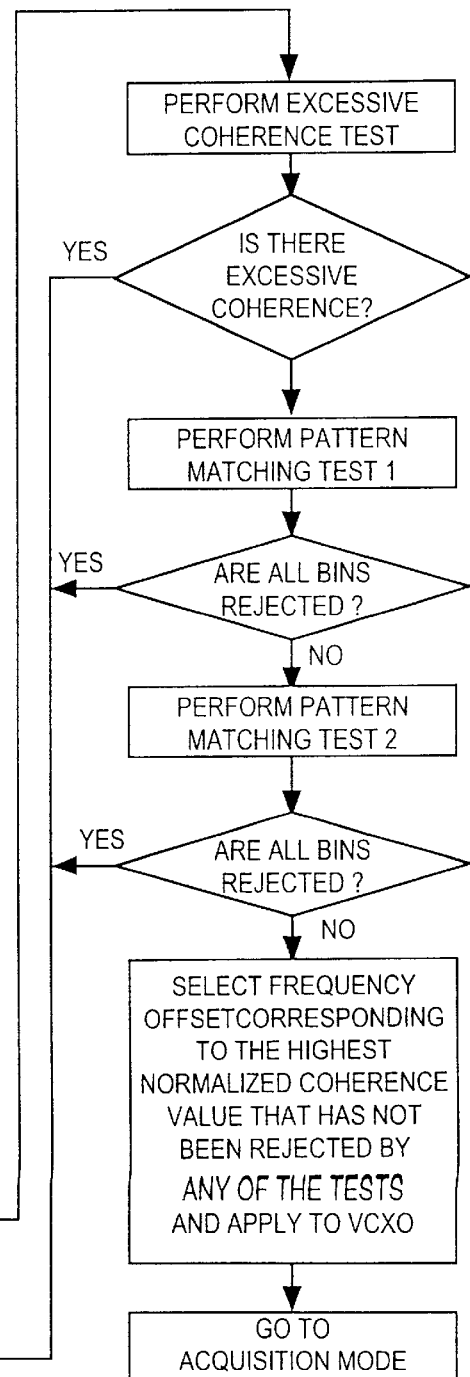
FIG. 5

APPARATUS AND METHOD FOR CLOCK SYNCHRONIZATION IN A MULTI-POINT OFDM/DMT DIGITAL COMMUNICATIONS SYSTEM

CROSS-REFERENCE TO RELATED APPLICATIONS

The present application is a continuation-in-part application of U.S. Ser. No. 08/700,779, filed Aug. 22, 1996, U.S. Pat. No. 5,790,514 and a continuation-in-part of U.S. Ser. No. 08/845,544, filed Apr. 24, 1997.

STATEMENT REGARDING FEDERALLY SPONSORED RESEARCH OR DEVELOPMENT

Not Applicable

BACKGROUND OF THE INVENTION

The present invention is directed to an OFDM/DMT digital communications system. More particularly, the present invention is directed to an apparatus and method for synchronizing the clocks used in a transmitter and receiver of an OFDM/DMT digital communications system. The present invention is particularly applicable in multipoint OFDM/DMT digital communications systems.

Multi-point communications systems having a primary site that is coupled for communication with a plurality of secondary sites are known. One such communications system type is a cable telephony system. Cable telephony systems transmit and receive telephone call communications over the same cable transmission media as used to receive cable television signals and other cable services.

One cable telephony system currently deployed and in commercial use is the Cablespan 2300 system available from Tellabs, Inc. The Cablespan 2300 system uses a head end unit that includes a primary transmitter and primary receiver disposed at a primary site. The head end unit transmits and receives telephony data to and from a plurality of remote service units that are located at respective secondary sites. This communication scheme uses TDM QPSK modulation for the data communications and can accommodate approximately thirty phone calls within the 1.9 MHz bandwidth typically allocated for such communications.

As the number of cable telephony subscribers increases over time, the increased use will strain the limited bandwidth allocated to the cable telephony system. Generally stated, there are two potential solutions to this bandwidth allocation problem that may be used separately or in conjunction with one another. First, the bandwidth allocated to cable telephony communications may be increased. Second, the available bandwidth may be used more efficiently. It is often impractical to increase the bandwidth allocated to the cable telephony system given the competition between services for the total bandwidth available to the cable service provider. Therefore, it is preferable to use the allocated bandwidth in a more efficient manner. One way in which the assigned bandwidth may be used more efficiently is to use a modulation scheme that is capable of transmitting more information within a given bandwidth than the TDM QPSK modulation scheme presently employed.

The present inventors have recognized that OFDM/DMT modulation schemes may provide such an increase in transmitted information for a given bandwidth. Such systems, however, present a number of technical problems. One such problem is the determination of how one or more remote receivers are to synchronize their internal clocks and timing systems with the internal clock and timing system of a primary transmitter at a central site. A remote receiver must first synchronize its internal clock and timing system with the clock used by the primary transmitter to synthesize the transmitted signal before the remote receiver can properly demodulate the data that it receives. A further problem occurs in multipoint communication systems in which there are plural groups of remote transmitters that transmit data to centrallized transceivers. Each group of transmitters often has its transmissions frequency multiplexed with transmissions from other groups before being demultiplexed for receipt by a particular central transceiver. The resulting multiplexing/demultiplexing operations introduce frequency offsets for which compensation must be made if the receiver of the central transceiver is to properly extract the correct data from the signals that it receives. The present inventors have recognized the need for such upstream and downstream clock synchronization and have disclosed solutions to these problems.

BRIEF SUMMARY OF THE INVENTION

A multi-point communications system is set forth herein. The communications system comprises a transmitter for transmitting OFDM/DMT symbols over a predetermined number of bins across a transmission medium. The OFDM/DMT symbols are generated using at least one timing signal. At least one of the predetermined number of bins includes pilot tone sub-symbols generated from a pilot tone having a frequency corresponding to the at least one timing signal. The communications system also includes a receiver for receiving the OFDM/DMT symbols from the transmission medium. The receiver demodulates the received symbols using at least one timing signal. The receiver has a first pilot tone search mode of operation in which the receiver adjusts its timing signal to scan the frequency range of the predetermined number of bins looking for the pilot tone sub-symbols and identifies the bin including the pilot tone sub-symbols. The receiver further has a subsequent second pilot tone acquisition mode in which the receiver adjusts the timing signal to receive the identified bin containing the pilot tone sub-symbol and measures phase differences between successive pilot tone sub-symbols to thereby perform a further adjustment of the timing signal so that the pilot tone sub-symbol is received within a frequency range sufficient for subsequent phase locked loop processing thereof.

In accordance with one advantageous embodiment of the system, the timing signal of the transmitter is used for timing inverse Fourier transform processing and for carrier generation in transmitting the OFDM/DMT symbols while the timing signal of the receiver is used for timing Fourier transform processing and for carrier generation in demodulating the received OFDM/DMT symbols.

Other features and advantages of the present invention will become apparent upon review of the following detailed description and accompanying drawings.

BRIEF DESCRIPTION OF THE SEVERAL VIEWS OF THE DRAWINGS

FIG. 4 illustrates various spectral distributions for the pilot tone bin and adjacent bins.

FIG. 5 is a flow chart illustrating one manner of executing the first pilot tone search mode of receiver operation.

DETAILED DESCRIPTION OF THE INVENTION

Figure 1:
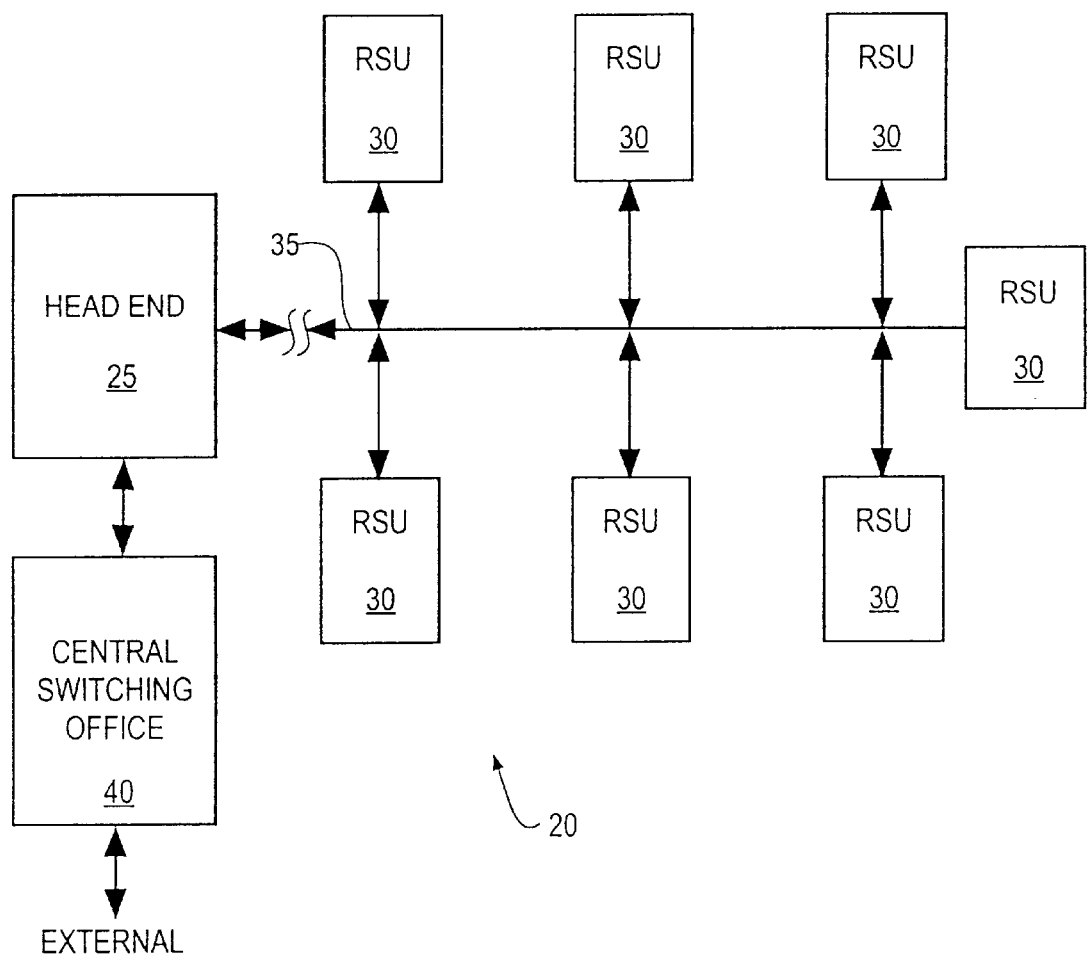
FIG. 1 is a schematic block diagram of a multi-point communications system having a plurality of remote service units disposed at a plurality of secondary sites wherein each of the remote service units comprises a receiver having an improved receiver architecture.

FIG. 1 is a block diagram of a multi-point communications system which may use a remote service unit having the improved receiver and transmitter architectures disclosed herein. As illustrated, the communications system, shown generally at 20 includes a head end unit (HE) 25 disposed at a primary site. The head end unit communicates with a plurality of remote service units (RSUs) 30 respectively disposed at a plurality of secondary sites, over a transmission medium 35 such as a coaxial cable.

The digital communications system 20 may, for example, be a cable telephony system. In such an application, the head end unit 25 is disposed at a cable television transmission facility while the remote service units 30 are disposed at individual customer locations, such as individual customer homes. The transmission medium 35 would be the new or existing transmission cable used to transmit the cable television services. The head end unit 25 in a cable telephony network is responsible for communicating with and interconnecting telephone calls between the plurality of remote service units 30 as well as communicating with a central switching office 40 for sending and receiving telephone calls from sites exterior to the local cable television service area.

The present system 20 utilizes OFDM/DMT digital data modulation for exchanging communications data between the head end unit 25 and the remote service units 30. Such OFDM/DMT digital data communications assign a particular amplitude, frequency, and phase for each transmitted "sub-symbol". The transmitted "sub-symbol" represents one or more information data bits that are to be transmitted between the units 25 and 30. Each sub-symbol may be represented by a point within a "constellation", the point being transmitted at a given carrier frequency or "bin".

Figure 2:
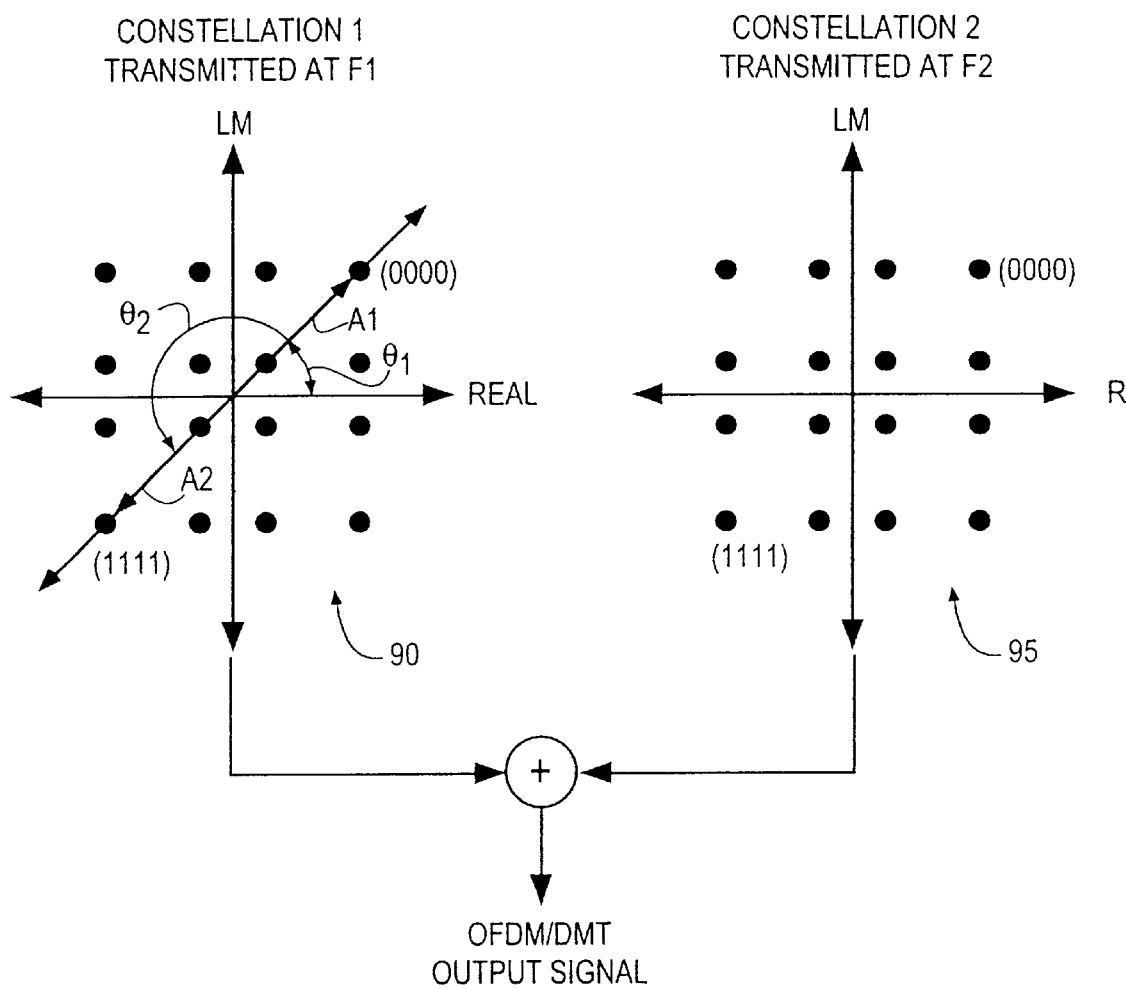
FIG. 2 illustrates two symbol constellations that are transmitted in two separate frequency bins in accordance with OFDM/DMT data modulation techniques.

FIG. 2 illustrates the use of two constellations 90 and 95, each having sixteen constellation points that are capable of being transmitted within two separate frequency bins. As illustrated, a sub-symbol having a carrier signal of frequency $f_1$ has its amplitude and phase varied depending on the constellation point that is to be transmitted. For example, a constellation point representing the binary states 0000 is transmitted as a sub-symbol at a phase of $\theta_1$ and an amplitude of $A_1$ during a designated symbol time. A constellation point representing the binary states 1111, however, is transmitted as a sub-symbol at a phase of $\theta_2$ and an amplitude of $A_2$ during a designated symbol time. Similarly, the second constellation 95, preferably having the same amplitude and phase designations for its sub-symbols as the first constellation 90, is used to modulate a second carrier frequency $f_2$. The resulting modulated signals are combined into a single output symbol in which the individual sub-symbols are differentiated from one another based on their respective carrier frequencies or "bins". It will be recognized that many variations of the disclosed OFDM/DMT transmission scheme are possible, the foregoing scheme being merely illustrated herein to provide a basic understanding of OFDM/DMT communications.

Figure 3:
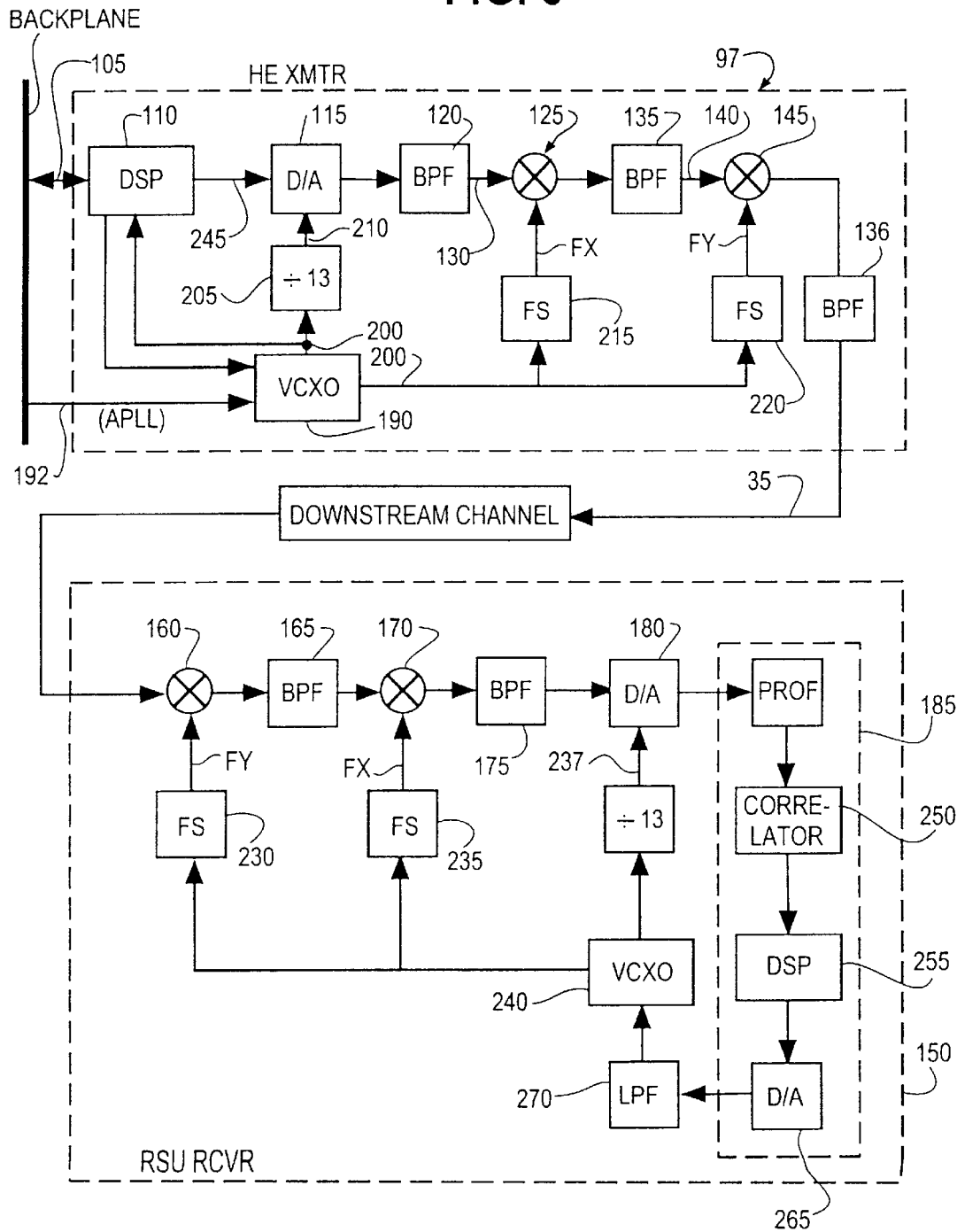
FIG. 3 is a block diagram of one embodiment of a head end unit and a remote service unit of the communications system of FIG. 1 showing those components involved in downstream synchronization.

A block diagram of one embodiment of the general components of a transmitter 97 of a head end unit 25 and a receiver 150 of a remote service unit 30 used for downstream clock synchronization is shown in FIG. 3. As illustrated, the transmitter 97 of the head end unit 25 receives data at one or more lines 105 and supplies this data to a digital signal processor 110 and its associated components (collectively, DSP). The DSP 110 accepts the digital data and performs a Fourier Transform, preferably an Inverse Fast Fourier Transform (IFFT), on the received data. The digital data resulting from the IFFT transformation is provided to the input of a digital-to-analog converter 115. The analog signal resulting from the conversion is preferably provided to the input of a band pass filter 120, the output of which is supplied to the input of a mixer 125 where the filtered output signal at line 130 is mixed to a first frequency $f_x$. A further band pass filter 135 is provided to remove the images resulting from the mixing process. The filtered output signal at line 140 is subject to a further mixing at mixer 145 where it is mixed to a second frequency $f_y$ suitable for transmission along the transmission medium 35 (e.g., RF, optical frequencies, etc.). A further band pass filter 136 may be provided to remove images resulting from the second frequency mixing process.

The receivers 150 of the remote service units 30 receive the OFDM/DMT data from the transmission medium 35. The received signal is demodulated using a first frequency, preferably $f_y$, at mixer 160. The mixed signal is provided to the input of a first bandpass filter 165 that filters the images resulting from the mixing process. The resulting signal is further mixed with a demodulating signal $f_x$ to a baseband level for the receiver 150 at mixer 170. Again, the images resulting from the mixing process are removed by a bandpass filter 175. The filtered signal is applied to the input of an analog-to-digital converter 180 that converts the filtered analog signal to digital samples that are subsequently processed by the digital signal processing portions 185 of the receiver 150. In that processing, the digital data signals received from the analog-to-digital converter 180 undergo a Fourier Transform, preferably an FFT, to extract the frequency and phase components of the received signal. Based on this processing, the digital signal processing portions 185 may reconstruct the data provided to the transmitter 97 at lines 105 of the head end unit 25.

As illustrated in FIG. 3, the transmitter 97 of the head end unit 25 includes a voltage controlled oscillator 190. The voltage controlled oscillator 190 provides a common clocking signal at lines 200 in response to a signal received from the DSP 110 or an analog phase locked loop signal 192 received on a back plane. The clocking signal at lines 200 is provided to, for example, the input of a digital counter 205 that generates a further clocking signal at line 210 that is provided to the input of the digital-to-analog converter 115 to control timing of the conversion process. This same clocking signal output 200 from the voltage controlled oscillator 190 is provided to the input of frequency synthesizer 215 and frequency synthesizer 220. The frequency synthesizers 215 and 220 use the received clocking signal to generate the mixing signals $f_x$ and $f_y$ to mixers 125 and 145, respectively. Thus, the timing of the OFDM/DMT symbol generation and the mixing of the generated symbols for transmission along transmission medium 35 are dependent upon the frequency and phase of the output signal 200 of the voltage controlled oscillator 190.

As noted above in the description of the receiver 150, the receiver 150 executes several mixing operations on the received signal and, further, performs an analog-to-digital conversion of the received signal. To properly perform the mixing and conversion operations and ensure the integrity of the extracted OFDM/DMT data, it is desirable to synchronize the signals used for the generation of the OFDM/DMT transmission by the transmitter 97 with the signals used for the demodulation and conversion of the symbols received at the receiver 150. Applying this principal to the embodiment set forth in FIG. 3, the signals output by frequency synthesizers 215 and 220 to mixers 125 and 145 at the transmitter 97 should be synchronized with the signals output by the frequency synthesizers 230 and 235 to mixers 160 and 170 at the receiver 150. Similarly, the clocking signal 210 supplied to the digital-to-analog converter 115 should be synchronized to the sampling clock signal 237 supplied to the analog-to-digital converter 180.

In the disclosed embodiment, a reference clock signal is embedded in the baseband OFDM digital signal by the transmitter 97 in order to perform the desired synchronization. This reference clock signal takes the form of a constant amplitude and phase sub-symbol that is transmitted in a particular frequency bin, and is called the pilot tone sub-symbol. The pilot tone sub-symbol has a frequency and phase corresponding to the signal output 200 from the voltage controlled oscillator 190 of the transmitter 97. Preferably, several bins are designated to include the pilot tone sub-symbol. Each receiver 150 seeks to recover any one of these tones, with the remaining pilot tones designated as backups. The receivers 150 demodulate the RF passband signal assigned to the RSU and attempt to extract the pilot tone from the baseband signal. The eventual goal is to "lock on" to the exact phase and frequency of the pilot tone. This is done by appropriately adjusting a voltage controlled oscillator 240 of the receiver 150 using a phase locked loop, such as a digital phase locked loop (DPLL). This results in the locking of the sampling clock signal 237 (A/D sampling rate) with the clocking signal 210 used by the transmitter 97 to control the timing of the D/A conversion of the binary data received at lines 105. Since the RF carrier frequency and sample clocks are tied together, this circuit topology and corresponding method also simultaneously accomplishes carrier recovery.

The entire pilot tone acquisition procedure can be viewed as a two stage process comprising search and acquisition of the pilot tone. To this end, the receiver 150 operates in accordance with at least two modes of operation. In a first pilot tone search mode of operation, the receiver scans the frequency range of the bins transmitted by the transmitter 97 in predetermined frequency steps looking for the bin containing the pilot tone. Once the bin containing the pilot tone sub-symbol has been identified, the receiver 150 makes a gross timing adjustment of the output signal of voltage controlled oscillator 240 to receive the bin including the pilot tone sub-symbol in the correct predetermined bin location. In a subsequently occurring second pilot tone acquisition mode, the receiver 150 also measures the phase difference between consecutive pilot tone sub-symbols to adjust the timing of the output of the voltage controlled oscillator 240 so that it is within a frequency range sufficient for subsequent phase locked loop processing of the pilot tone signal. After this acquisition has taken place, the receiver 150 switches to a steady state tracking mode in which the phase locked loop is used to constantly maintain synchronism with the transmitter 97.

There are at least two ways in which this subsequent synchronism may be maintained. First, when the PLL is using the pilot-tone, the constant pilot-tone sub-symbol is known to the PLL beforehand. For each symbol time, the receiver demodulates the pilot-tone bin and computes the error between the demodulated sub-symbol and the known value. This error signal then is filtered and run through the D/A to control the VCXO appropriately. In contrast, a decision directed mode may also the used to maintain synchronism. When decision directed mode is used, the PLL selects a some bin carrying random data for processing. The receiver does not know the transmitted sub-symbols a priori. Each symbol time, therefore, the chosen bin is demodulated and then sliced to the nearest constellation point. The difference (or error) between the sliced and un-sliced sub-symbol is used to drive the PLL as before. Operation in the decision directed mode is limited to situations in which the decisions are expected to be correct.

The foregoing, two-stage operation of the receiver 150 is used at "cold start-up" of the receiver 150. This happens, for instance, when an RSU 30 powers up for the first time or when it attempts to re-establish communication with the HE 25 after a prolonged period of inactivity. The acquisition process follows a successful search. However, the first pilot tone search mode in which the receiver 150 performs the requisite search for the bin containing the pilot tone sub-symbol may be skipped for "warm start-ups", i.e. when the receiver 150 already has a fix on the location of the pilot tone sub-symbol and is merely attempting to re-establish communication with the HE 25 after a brief period of disruption. After successful acquisition of the pilot tone in the second pilot tone acquisition mode, a steady state tracking procedure is initiated by the receiver 150 that thereafter maintains the timing of the RSU 30 in synchronism with the timing of the HE 25.

The foregoing modes of receiver operation are desirable for a number of reasons. One reason relates to the result of discrepancies between the output signals of the voltage controlled oscillators 190 and 240 at the HE transmitter 97 and RSU receiver 150, respectively. Such signals potentially have frequency deviations (typically specified in ppm) that, when coupled with the high RF modulating frequencies typically used for transmission over the transmission medium 35, result in mutual frequency offsets. For example, if the voltage controlled oscillators 190 and 240 are specified at 30 ppm and 50 ppm respectively, then for an RF modulating frequency of 750 MHz, frequency offsets up to +/−60 KHz are possible. As a result of this frequency offset, the downconverted OFDM baseband spectrum at the receiver 150 is displaced in frequency. The frequency locking range of a typical baseband DPLL is in the order of 500 Hz and, thus, the pilot tone will most likely lie outside the frequency locking range of the DPLL. The foregoing receiver mode operations bring the pilot tone within the locking range of such a DPLL.

As noted above, two receiver modes of operation are employed. The first pilot tone search mode of operation performs a generally gross adjustment of the voltage controlled oscillator 240 that reduces the frequency offset between the pilot tone and the output of the voltage controlled oscillator 240 to within a fraction of a frequency bin (e.g., ½ to ¼ of a bin). The second pilot tone acquisition mode of operation uses the gross adjustment to provide a more accurate estimate of the frequency offset which is then used as the starting point for the DPLL.

To begin the first pilot tone search mode of operation, the RSU receiver 150 A/D samples the baseband OFDM signal at the analog-to-digital converter 180 and inputs the samples into, for example, a hardware correlator 250. Details of one embodiment of such a hardware correlator, although not pertinent to the present invention, can be found in U.S. Ser. No. 08/845,544, filed Apr. 24, 1997 (Attorney Docket No. 11521US01). The correlator 250 can be viewed as a direct digital implementation of a discrete Fourier transform (DFT) over, for example, 9 frequency bins. In other words, the correlator 250 provides symbol rate complex outputs to the DSP 255 for subsequent processing. In the present embodiment, a substantial portion of the first and second receiver modes of operation are implemented in the DSP 255 on symbol rate outputs from the hardware correlator 250.

In accordance with one embodiment of the first pilot tone search mode of receiver operation, the number of bins that need to be searched has to be determined. Generally, such a determination depends upon the particular system requirements. For exemplary purposes, it will be assumed that the system employs a bin width of 9.615 KHz and uses a pilot tone bin that is located as the $12^{th}$ bin in a total receive window of 26 bins. The number of bins to be searched depends on the accuracy of the voltage controlled oscillators 190 and 240 at the HE 25 and RSU 30. If frequency offsets of up to +/−60 KHz are possible (see above), and each bin is 9.615 KHz wide, 13 bins will be searched—the $12^{th}$ bin and 6 bins on each side of the $12^{th}$ bin in the window.

It is also desirable to select a predetermined spectral pattern that will be used to find the pilot tone. As such, a sufficient and minimal set of metrics based on the pattern that will indicate with high probability that the pilot is found may be employed in the first pilot tone search mode. This pattern should be limited to as few bins as possible to minimize bandwidth usage while at the same time being distinct from the rest of the spectrum. Several possible symmetric and asymmetric spectral patterns are shown in FIGS. 4(*a*)–4(*d*).

For exemplary purposes, the 5-bin-wide pattern of FIG. 4(*a*) is employed in the instant case. This pattern has a pilot tone disposed in one bin with two adjacent empty (zero power) bins on each side thereof. The two outermost bins which are beside each of the empty bins carry either actual data or random data. This ensures that there will always be a stable non-zero average power in these two outermost bins. Note that the wider the pattern is, the larger the number of bins that need to be received. For instance, if 13 bins are possible candidates for the pilot location, then this 5-bin pattern requires that the receiver 150 receive and process 17 bins.

It is further assumed for purposes of the present example that there are eight, 26-bin windows transmitted by the HE 25, and that four predetermined windows among the eight will include predetermined bins having the spectral pattern with the pilot tone. Pursuant to the first pilot tone search mode of operation, the receiver 150 of the RSU 30 adjusts to receive one of the predetermined windows with the pilot tone. A selected window number is predetermined and back-up windows are also predetermined in the event that pilot recovery fails for the window of choice.

FIG. 5 illustrates one manner of implementing the first pilot tone search mode in the receiver 150. In the specific implementation illustrated here, a wide range of tests are performed on received signals to verify the presence of the pilot tone. However, it will be recognized that fewer than all such tests may be used in this mode yet still achieve satisfactory results.

In connection with the search mode, each RSU 30 has a table of, for example, five frequency offset values (also called DAC offset table) for its voltage controlled oscillator 240 for each window. The DAC table is used to scan a window in, for example, five steps of 1.923 KHz each (9615/5 Hz). By using scanning steps equal to a fifth of the width of a bin, it is possible get an estimate of the pilot location to within 1.923 KHz (9615/5 Hz). To implement the scanning, the receiver 150 of the RSU 30 runs through a table of five output values supplied to the digital-to-analog converter 265. The output of the digital-to-analog converter 265 is supplied to the input of a low pass filter 270, the output of which is an analog control voltage that alters the frequency of the output signal from the voltage controlled oscillator 240. Thus, each value that is output corresponds to a frequency offset of the voltage controlled oscillator 240. For each offset value, the RSU 30 carries out a number of functions.

First, the receiver 150 changes the frequency offset of the voltage controlled oscillator 240 by a fifth of the width of a bin. This change of the frequency offset is performed by writing the correct DAC output value in the table of five DAC output values to the digital-to-analog converter 265. Immediately after writing to the digital-to-analog converter 265, several symbols have to be discarded to allow the frequency output of the voltage controlled oscillator 240 to stabilize. The number of symbols to be discarded will depend on the voltage controlled oscillator properties and the magnitude of the change in frequency. As such, the receiver 150 may need to discard a few hundred symbols.

Next, a complex phase correction term due to the frequency offset in the receiver 150 is applied to each received sub-symbol. Such a phase correction is necessary when the data transmitted by the transmitter 97 is in the form of a formatted data frame having, for example, a cyclic prefix or an analogous counterpart. The phase is corrected in accordance with the following equation:

$$J_{i,j}(l) = I_{i,j}(l) e^{\sqrt{-1}\Phi l}$$

For i=1, . . . , 17 and j=0,1,2,3,4 and where $$\Phi = 2\pi f_{off}\left(\frac{CP}{N}\right)$$

is the incremental phase correction applied to all received sub-symbols in the chosen window received with an offset of $f_{off}$ frequency bins with respect to the transmitted bins (see the discussion in the following paragraph), and l is the symbol index. Here, the j index corresponds to the index into the DAC offset table corresponding to the frequency steps used to scan the predetermined window having the pilot tone. The term $I_{i,j}(l)$ is the received symbol in the $i^{th}$ bin for the $j^{th}$ DAC offset table value.

This incremental phase shift is applied in systems in which a cyclic prefix is used and each of the remote receivers are designed to only process signals within a passband beginning at a fixed frequency corresponded to a predetermined bin (e.g., bin 64). In such a system, the HE transmits across substantially the entire available signal spectrum. However, the receiver of each RSU mixes the transmitted signal so that the frequency range of the window that it is to process is mixed to begin at the fixed frequency corresponding to the predetermined bin. The $f_{off}$ values for each window, accordingly, are system dependent and, thus, are dependent on the system design parameters. It should be noted that the value of CP is zero if a cyclic prefix, or an analogous counterpart, is not transmitted from the transmitter 97.

After the phase correction has been completed, the power of the signal received in each of the bins is computed as is the signal's correlation. Assuming that the pilot signal bin is known to be the 12th bin in the window, the squared magnitude of each symbol in the 12th bin in the window and the 8 bins on either side of the 12th bin (for a total of 17 bins) is computed.

The receiver 150 computes the correlation of the current symbol $J_{i,j}(l)$ with the complex conjugate of the previous symbol $J_{i,j}(l-1)$ for the 12th bin and 6 bins on each side of the 12th bin (for a total of 13 bins) in accordance with the following equation:

$$R_{i,j}(l) = J_{i,j}(l) \times J_{i,j}^*(l-1)$$

where i is the bin number and j is the index into the DAC offset table for the voltage controlled oscillator 240 for each of these equations. The correlation will be constant if the bin number and index includes the pilot tone.

The foregoing power and correlation calculations are then averaged for each bin i and index j over L symbols. Accordingly, the foregoing operations are repeated for L symbols to compute the averages in accordance with the following averaging equations:

$$P_{i,j}(L) = \frac{1}{L} \sum_{l=1}^{L} |J_{i,j}(l)|^2$$

$$H_{i,j}(L) = \left| \frac{1}{L} \sum_{l=1}^{L} R_{i,j}(l) \right|^2$$

where $P_{i,j}$ and $H_{i,j}$ are the average power and coherence in the ith bin and for the jth index over L symbols.

After averaging, the metrics for each bin i and index j are computed. To this end, for each index j, the following metrics are computed for the 12th bin and 6 bins on each side of the 12th bin (for a total of 13 bins):

$$A_{i,j} = P_{i,j}(L) - P_{i-1,j}(L) - P_{i+1,j}(L)$$

$$B_{i,j} = |P_{i-1,j}(L) - P_{i+1,j}(L)|$$

$$C_{1,i,j} = P_{i-2,j}(L) - P_{i-1,j}(L)$$

$$C_{2,i,j} = P_{i+2,j}(L) - P_{i+1,j}(L)$$

Note that the number of metrics and the definition of the metrics will depend on the spectral patterns used, the foregoing metrics being those used for the spectral pattern of FIG. 4(*a*).

If the table of output values to the voltage controlled oscillator 240 is not exhausted after computing the metrics, the entire process above is repeated using the next value in the DAC offset table. If the table has been exhausted, $H_{i,j}(L)$ and $P_{i,j}(L)$ are re-ordered in a predetermined fashion. Where the DAC offset index runs from 0 to 4, $H_{i,j}(L)$ is re-ordered as $H_{i,0}(L)$, $H_{i,1}(L)$, $H_{i,2}(L)$, . . . . The same re-ordering is performed on array $P_{i,j}(L)$. Such ordering can be incorporated into earlier operation to save processing time by using appropriate addressing methods. After this rearrangement, each of the arrays should have 65 elements.

The square root of each element $H_{i,j}(L)$ in the array of correlation metrics is then computed and the result is divided by the corresponding average power value $P_{i,j}(L)$ to provide a normalized correlation metric $T_{i,j}$ in accordance with the following equation:

$$T_{i,j} = \frac{\sqrt{H_{i,j}(L)}}{P_{i,j}(L)}$$

The pilot tone will have a high degree of coherence and hence the $T_{i,j}$ values will be large (close to 1) for bins in the neighborhood of the bin containing the pilot tone. All other bins will have very low coherence (close to 0) as they will either be carrying uncorrelated data or will have zero power and be effectively Gaussian noise. Thus, the coherence test is a simple threshold test which eliminates from consideration all bins that have $T_{i,j}$ values less than a predetermined value. This predetermined value, for example, may be in the range of 0.5–0.8. The test can thus be represented as follows:

Reject (bin,index) pair (i,j) if $T_{i,j} < \lambda$ where $0.5 < \lambda < 0.8$.

If all the bins in the window are eliminated, then the receiver 150 will move on to a backup window and repeat the foregoing search process.

In addition to undergoing a coherence test, the acquired signals may also undergo an excessive coherence test that is executed during the first pilot tone search mode. This test is used to reject a window if there are coherent interferers too close to the pilot tone and/or too many coherent interferers in the window. This test may be used to successfully reject video channels when hands-off provisioning is desired. In NTSB standard video channels, the spectrum has several carriers that are spaced evenly at about 16 KHz apart. This is very close to the bin spacing that is used in the exemplary embodiment here. If only the foregoing coherence test and the pattern matching tests (described below) were used, several bin groupings would pass these tests. Thus, the test for excessive coherence is useful to ensure that there is only one grouping of bins that passes the tests.

The excessive coherence test involves using a lowpass filter with, for example, 13 taps with all taps set to unity to filter the array of $T_{i,j}$ values. The maximum output of the filter, $T_{max}$, is compared to a threshold value $T_{th}$ that is determined, for example, experimentally. If $T_{max} < T_{th}$, then the window is rejected and the receiver will move on to the next window and begin processing anew. Note that the evenly spaced spectral pattern of the cable channel could be rejected with either of the asymmetric spectral patterns in FIGS. 4(*c*)–4(*d*) with appropriate pattern matching tests. However, the excessive coherence test is still useful in the case of coherent interference near the pilot tone.

The receiver 150 may then perform one or more successive pattern matching tests. The pattern matching tests compare the spectral pattern around each bin with the expected pattern in FIG. 4(*a*). The particular pattern matching tests depend on which pattern is used. In accordance with a first test, the receiver rejects(bin,index) pairs that satisfy the following criterion:

$C_{1,i,j} < 0$ or $C_{2,i,j} < 0$

Another possible rejection criterion that can be used instead of the above is $C_{1,i,j} < B_{i,j}$ or $C_{2,i,j} < B_{i,j}$ Again, if all the bins in the window are rejected, then the receiver will move on to a backup window and start anew.

A further subsequent pattern matching test may also be performed by the receiver 150. In accordance with this further test, the receiver rejects the bin/index pairs that satisfy the following criterion:

$$A_{i,j} < \mu B_{i,j}$$

The value of $\mu$ is, for example, selected experimentally and usually lies between 1 and 10. If all the bins in the window are eliminated, then the receiver will move on to a backup window and start anew.

After the above tests are performed, all the bins except for a few grouped around the bin containing the pilot tone will be rejected. The best bin i and index j into the DAC offset table for the voltage controlled oscillator 240 is found by searching for the largest $T_{i,j}$ value among the 65 values. Using the index j corresponding to the largest $T_{i,j}$, the output value that is to be provided to the digital-to-analog converter 265 is found from the table of DAC output values and the voltage-controlled-oscillator is directed to proceed to the correct position to allow further processing in the second pilot tone acquisition mode of operation.

Figure 6:
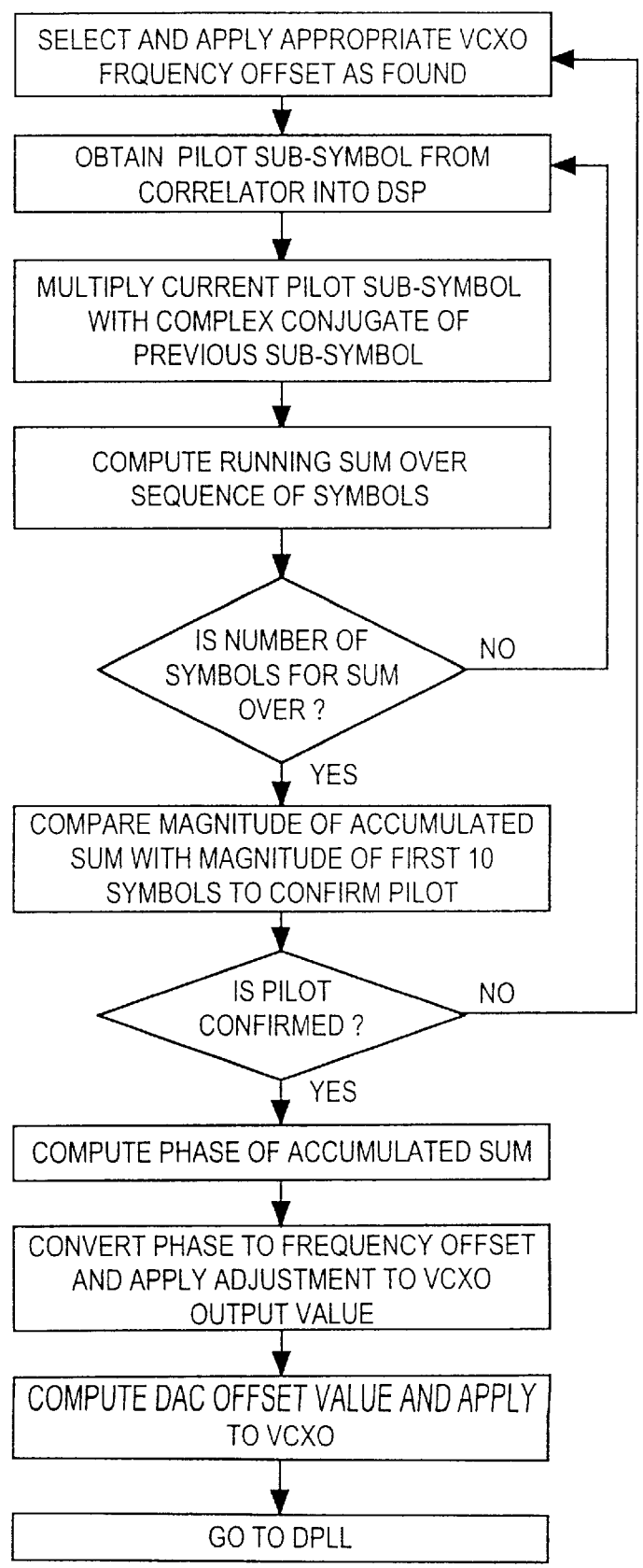
FIG. 6 is a flow chart illustrating one manner of executing the second pilot tone acquisition mode of receiver operation.

One embodiment of the implementation of the second pilot tone acquisition mode is set forth in connection with FIG. 6. With respect to the second pilot tone acquisition mode, it can be shown that in the absence of any interference from data carrying bins, there is a phase offset (in radians) between consecutive pilot symbols given by the equation:

$$\Theta = 2\pi\left(\varepsilon + (f_{off} + \varepsilon)\left(\frac{CP}{N}\right)\right) = 2\pi\varepsilon\left(1 + \frac{CP}{N}\right) + \Phi$$

where $\varepsilon$ is the fractional (normalized) frequency offset in bins. For example, if the residual frequency offset after the first pilot tone search mode is completed is 1 KHz, and for a bin width of 9.6 KHz, $\varepsilon=1/9.6=0.104$. The phase rotation $\Phi$ is predetermined by the window number and is corrected as soon as the correlator outputs are available to the DSP. In the second pilot tone acquisition mode, the receiver 150 extracts the phase differences between consecutive pilot tone sub-symbols to estimate $\varepsilon$. To this end, let I(n) denote the nth complex symbol obtained after the phase correction noted above. To estimate the frequency offset, the receiver 150 forms a sum using N symbols as, $$S(N) = \sum_{l=1}^{N} J(l)J*(l-1)$$

where J*(n) denotes the complex conjugate of the nth symbol. An estimate of the fractional frequency offset is then obtained as $$\hat{\varepsilon} = \frac{1}{2\pi\left(1 + \frac{CP}{N}\right)} atan\left(\frac{Im(S(N))}{Re(S(N))}\right)$$

Since $\hat{\varepsilon}$ is a signed dimensionless number normalized by the bin width, it is converted to a frequency offset (in Hertz) by multiplying it by the bin width. This frequency offset is translated to the appropriate numerical value and written out to the digital-to-analog converter 265. To meaningfully interpret the output of the second pilot tone acquisition mode, $|\hat{\varepsilon}|<0.5$, i.e. the magnitude of the residual frequency offset is less than half of a bin width.

After the receiver 150 has completed operation in the second pilot tone acquisition mode, the voltage controlled oscillator 240 is set to the best estimate of the pilot tone and is within the locking bandwidth of a DPLL. The DPLL begins operation by utilizing the difference between the phase of the received pilot tone and its constant desired (transmitted) value as the error signal. This symbol rate error signal is filtered by, for example, a type II proportional-integral (PI) loop filter to generate the control voltage for adjusting the voltage controlled oscillator 240. The second order loop filter ensures a zero steady state error in the face of frequency offsets. The loop filter transfer function is given by, $$L(z) = K_P + \frac{zK_I}{z-1}$$

results in an overall transfer function of the form.

$$H(z) = \frac{(K_P + K_I)z - K_P}{z^2 + (K_P + K_I - 2)z + 1 - K_P}$$

With appropriately chosen DPLL parameters, phase lock can be achieved within a few thousand symbols. Also, several sets of DPLL parameters are chosen to provide multiple loop bandwidths. For instance, the loop bandwidth takes on the highest value during acquisition and the lowest during tracking.

After sample timing has been acquired, the RSU receiver 150 constantly maintains the correct timing. This requires the continuous operation of the DPLL. Since each RSU 30 in the present embodiment can demodulate at most 9 bins, it is wasteful of bandwidth to constantly use these bins for a pilot tone. Thus, after successful acquisition, the DPLL preferably switches to any one of the data carrying bins and operates in a decision directed tracking mode. For relatively clean downstream channels, this approach is robust and bandwidth conserving.

From the foregoing description of the clock synchronization, it is seen that all RSUs synchronize their receive clocks to the master clock provided by the HE. The transmit clock used to synthesize the transmissions from the transmitter of each RSU 30 is preferably likewise generated from the voltage controlled oscillator 240 at the RSU 30. Similarly, the receive clocks of the receiver 287 (see FIG. 7) of the HE 25 may be generated from voltage controlled oscillator 190. The XMT VCXO 190 itself is derived, for example, via an analog-PLL signal that, for example, is received from a HE backplane. Thus, the HE 25 need only provide a stable clock reference and the burden of synchronization largely rests with the RSUs 30.

In the example RSU transmitter 277, a DSP 401 outputs information to be transmitted to the head end receiver 287. The output from the DSP 401 may be filtered by a finite impulse response band-pass filter 402 (hereinafter "FIR BPF"). The output of the FIR BPF 402 is converted to an analog signal by a D/A converter 403. The analog output signal from the D/A converter 403 is filtered by a first band-pass filter 404 to remove unwanted signal components. The output from the first band pass filter 404 is mixed by a first mixer 405 with an intermediate frequency output from a first frequency synthesizer 406. The output of the first mixer 405 is filtered by a second band-pass filter 407 to remove unwanted signal components. The output of the second band-pass filter 407 is mixed by a second mixer 408 with a transmission frequency output from a second frequency synthesizer 409. The output of the second mixer 408 is transmitted on the upstream channel 35 to the head end. The RSU receiver 277 includes a VCXO (which may be the same as the VCXO 240 used in the RSU receiver 150). The VCXO 240 outputs a timing signal 200 (as in the RSU receiver 150). The timing signal 200, in turn, drives the first and second frequency synthesizers 406, 409 and also provides timing to the D/A converter 403 through a frequency down-converter 410.

Figure 7:
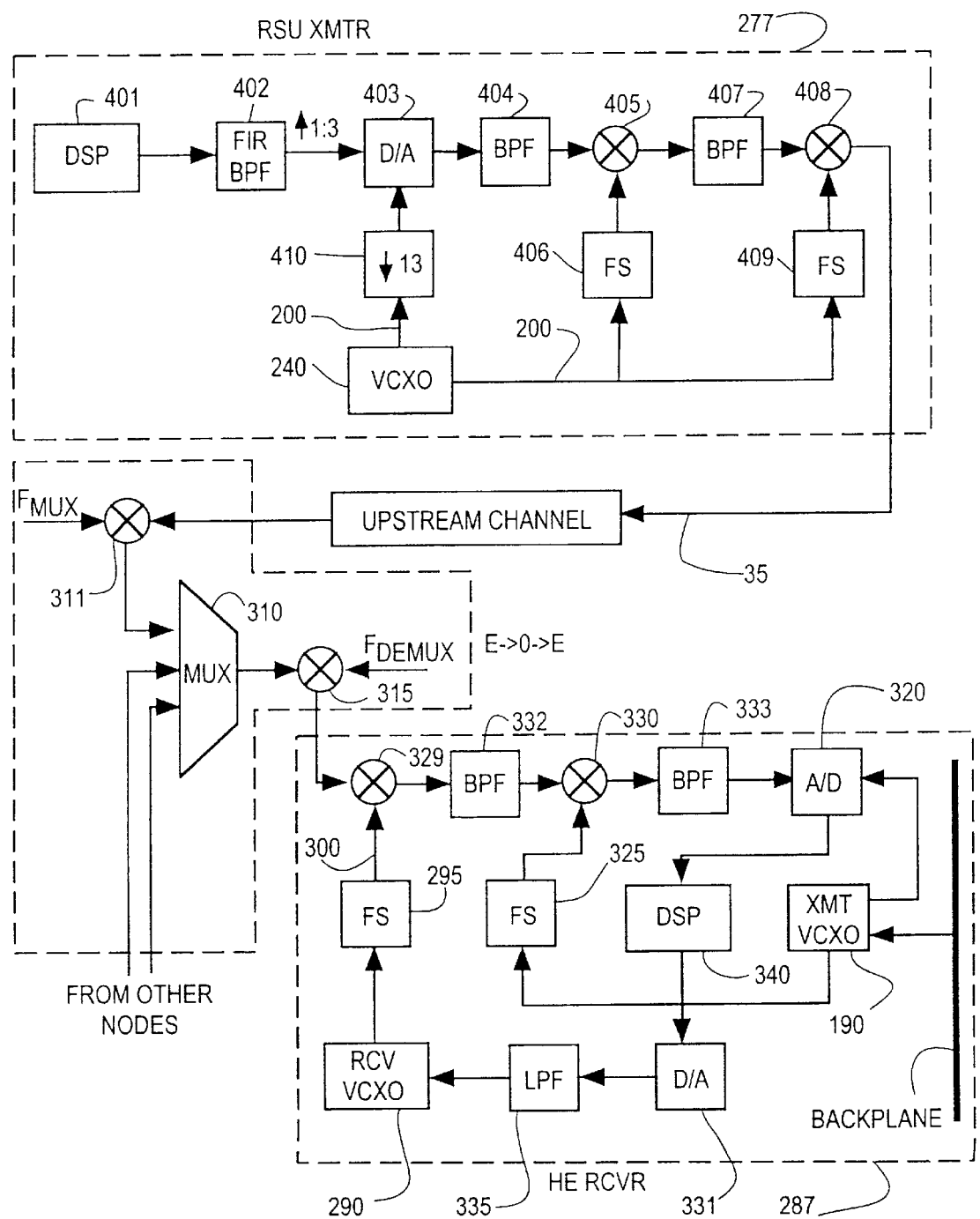
FIG. 7 is a block diagram of an embodiment of a head end unit and a remote service unit of the communications system of FIG. 1 showing those components involved in upstream synchronization.

This situation, however, is altered by any frequency shifts incurred in the upstream transmissions from the RSUs 30 to the HE 25. Specifically, in some multipoint communication systems, frequency offsets are introduced due to multiplexing of upstream signals from several remote sites onto a single optical fiber at intermediate nodes, for example, electro-optical nodes. The signals are demultiplexed at the HE 25 and downconverted to the original sub-split return frequency band. Use of such conversions can greatly reduce the noise level on the upstream channel along the transmission medium 35. However, the clocks used for multiplexing and de-multiplexing at these nodes are typically not synchronized with each other (i.e. they are relatively free running) and introduce frequency offsets, possibly in the range of several KHz. Such a system is illustrated in FIG. 7.

The present inventors have recognized this problem and have provided a solution. With reference to FIG. 7, a second voltage controlled oscillator 290 is used at the HE 25 which serves as the clock reference for one of the frequency synthesizers 295 included in the RF sub-system of the receiver 287 of the HE 25. The voltage controlled oscillator 290 has its output signal at line 300 synchronized with a pilot tone provided by the transmitter 277 of the RSU 30. The pilot tone from the RSU 30 is provided in a predetermined bin. The HE 25 and RSU 30 need only carry out the synchronization process once when the first RSU powers up and is seeking to establish upstream communication with the HE 25 or after bi-directional communications have been disrupted for a prolonged interval of time. Thereafter, the HE 25 maintains synchronism with all RSU transmitters 277 by operating a symbol rate acquisition DPLL in decision directed tracking mode. The use of this separately synchronized voltage controlled oscillator 290 compensates for frequency offsets introduced by the free running clocks of the multiplexers 310, multiplexer mixer 311 and demultiplexer 315. Note that in-spite of the upstream frequency offsets, the analog-to-digital converter 320 of the receiver 287 of the HE 25 and frequency synthesizer 325 used by mixer 330 can still be driven off the voltage controlled oscillator 190.

The upstream synchronization process is initiated after the RSU 30 has acquired downstream synchronization and thereby has the capability to properly receive messages from the HE 25. Concurrent with the transmission of pilot tones, the HE demodulates all bins and continually measures the received power in a predetermined window of a predetermined number of bins (possibly all bins designated for communication) around a pre-designated bin. This bin, designated as the upstream pilot tone bin, is used by the first RSU 30 to transmit an upstream pilot tone after deriving its own upstream clock via the synchronization process described above. Since there is only one transmitting RSU 30, the HE 25 can locate the pilot tone bin with relative ease, compute the frequency offset (if any), and appropriately adjust voltage controlled oscillator 290. Also note that as in the RSU receiver 150 illustrated in FIG. 2, band-pass filters 332, 333 follow the mixers 329, 330 to remove unwanted signal components.

Figure 8:
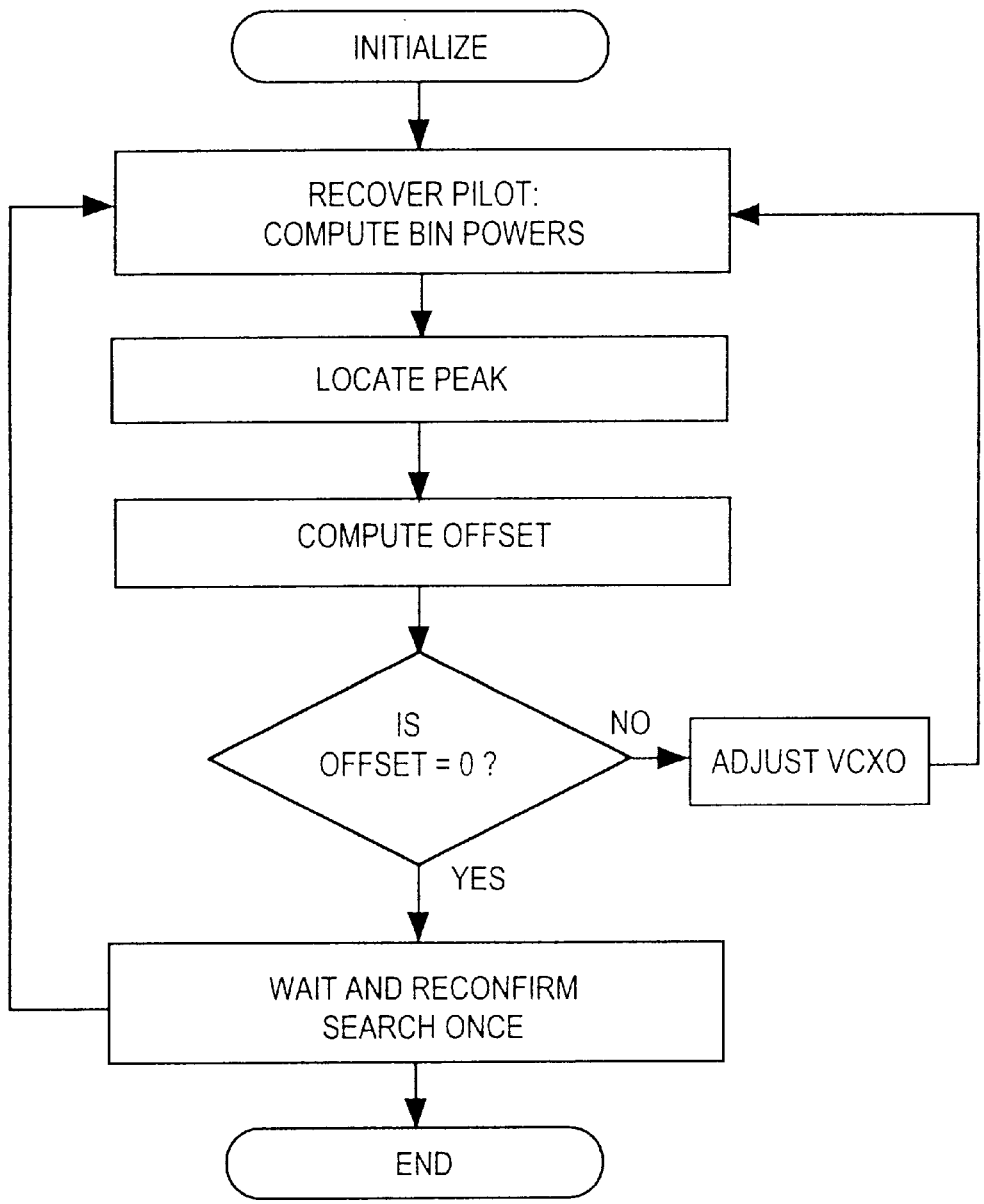
FIG. 8 is a flow chart illustrating one manner of executing the upstream synchronization.

One embodiment of the upstream synchronization process is set forth in connection with FIG. 8. As illustrated, the synchronization process begins with a search for the pilot tone transmitted by the RSU 30. Pursuant to the synchronization process, an initialization is first performed. In the initialization process, the transmitter 277 of the RSU 30 transmits a pilot tone having constant phase and constant amplitude after it has successfully executed the downstream pilot tone search and acquisition processes. The pilot tone is transmitted in the upstream pilot tone bin for a predetermined number of consecutive symbols unless it receives a message from the HE 25 to do otherwise.

If upstream synchronization is to proceed after initialization, the HE 25 demodulates all bins and continuously measures receive power in a window of a predetermined number of bins centered around the pre-designated upstream pilot tone bin. The HE 25 then locates the bin for which (a) receive power is maximum and (b) the magnitude of difference in power with adjacent bins exceeds a predetermined threshold. Such determinations can be made in the manner described above. Additionally, further coherency tests, etc., may also optionally be employed. This bin is selected as the bin which is most likely to contain the pilot tone. The HE 25 then uses the selected bin to compute the frequency offset (in bins) of the selected peak power bin from its expected location. Note that the offset would be zero when the muxing/demuxing process is ideal. The voltage controlled oscillator 290 is then adjusted to compensate for the frequency offset by translating the offset frequency into a signed control voltage that is applied to the voltage controlled oscillator 290 by a digital-to-analog converter 330 (and, preferably, through a low pass filter 335) that is responsive to a control signal provided by the digital signal processor 340. The HE 25 then waits for a predetermined number of symbols and further refines any adjustment that may be necessary until a zero offset results.

After the upstream pilot tone search process has been successfully completed, the HE 25 executes an upstream acquisition process. This acquisition process is substantially similar to the process noted above in connection with the second pilot tone acquisition mode of the RSU receiver 150. The DPLL parameters for the HE 25, however, are likely to be different than those used in the RSU DPLL. After acquisition is complete, the HE 25 may send an appropriate message to the first RSU to indicate successful capture of and synchronization with the upstream pilot tone. At this point, the HE 25 and RSU 30 may be considered to have successfully carried out sample timing and carrier recovery for both the downstream and upstream channels.

After successful acquisition has taken place, the HE 25 needs to constantly run the acquisition DPLL in a tracking mode. Loss of tracking can lead to disruption in upstream communication with the entire RSU population (often several hundred RSUs) served by the HE 25. Unlike acquisition, tracking can reliably proceed in decision directed mode. The HE 25 instructs the first RSU to transmit random data in a bin lying within the transmit range of the RSU 30. Even though the HE 25 employs random data transmissions from any one RSU 30, it can designate more than one RSUs for additional reliability. This process continues unchanged even if the RSUs being used for tracking begin to carry live traffic.

Other aspects of an OFDM/DMT communications system are set forth in U.S. Ser. No. 08/845,544, filed Apr. 24, 1997, titled "SYMBOL ALIGNMENT IN A MULTIPOINT OFDM/DMT DIGITAL COMMUNICATION SYSTEM" (Attorney Docket No. 11521US01) and in co-pending application Ser. No. 08/900,791, filed Jul. 25, 1997 (Attorney Docket No. 11824US01), titled "APPARATUS AND METHOD OR UPSTREAM CLOCK SYNCHRONIZATION IN A MULTIPOINT OFDM/DMT DIGITAL COM- MUNICATION SYSTEM", that are hereby incorporated by reference. These other aspects, however, are not particularly pertinent to the present synchronization system.

Although the present invention has been described with reference to specific embodiments, those of skill in the art will recognize that changes may be made thereto without departing from the scope and spirit of the invention as set forth in the appended claims.

What is claimed is:

1. A communications system comprising:
   a transmitter for transmitting OFDM/DMT symbols over a predetermined number of bins across a transmission medium, the OFDM/DMT symbols being generated using at least one timing signal, at least one of the predetermined number of bins including a pilot tone sub-symbol having a frequency corresponding to the sampling clock signal; and
   a receiver for receiving the OFDM/DMT symbols from the transmission medium, the receiver demodulating the received symbols using at least one timing signal, the receiver having a first pilot tone search mode of operation in which the receiver adjusts its timing signal to scan the frequency range corresponding to the predetermined number of bins looking for the pilot tone sub-symbol and identifies the frequency of the bin including the pilot tone sub-symbol by identifying a known spectral pattern, the receiver further having a subsequent second pilot tone acquisition mode in which the receiver adjusts its timing signal to receive the identified bin containing the pilot tone sub-symbol and measures phase differences between successive pilot tone sub-symbols to thereby perform a further adjustment of the timing signal so that the pilot tone sub-symbols are received within a frequency range sufficient for subsequent phase locked loop processing thereof.

2. A communications system as claimed in claim 1 wherein the timing signal of the transmitter is used for timing inverse Fourier transform processing and for carrier generation in transmitting the OFDM/DMT symbols.

3. A communications system as claimed in claim 1 wherein the timing signal of the receiver is used for timing Fourier transform processing and for carrier generation in demodulating the received OFDM/DMT symbols.

4. A communications system as claimed in claim 2 wherein the timing signal of the receiver is used for timing Fourier transform processing and for carrier generation in demodulating the received OFDM/DMT symbols.

5. A communications system as claimed in claim 1 wherein the receiver computes coherency of sub-symbols received in each bin scanned during the first pilot tone search mode of operation, the receiver rejecting bins having sub-symbols with coherency below a predetermined threshold as not including the pilot tone sub-symbols.

6. A communications system as claimed in claim 1 wherein the receiver computes excessive coherency of sub-symbols received in each bin having a coherency above the predetermined threshold, the receiver rejecting bins having sub-symbols having excessive coherency as not including the pilot tone sub-symbols.

7. A communications system as claimed in claim 1 wherein the bin including the pilot tone sub-symbol is disposed proximate a plurality of proximate bins, the bin containing the pilot tone sub-symbol and the plurality of proximate bins defining a predetermined spectral pattern.

8. A communications system as claimed in claim 1 wherein the spectral pattern is symmetric.

9. A communications system as claimed in claim 1 wherein the spectral pattern is asymmetric.

10. A communications system as claimed in claim 1 wherein the OFDM/DMT symbols are transmitted in periodically occurring formatted symbol frames, each formatted symbol frame having a cyclic prefix.

11. A communications system as claimed in claim 10 wherein the receiver adjusts the timing signal in the second mode of operation in accordance with a plurality of operations, the plurality of operations comprising:
    computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot tone sub-symbol obtained after phase correction for the cyclic prefix and J*(n) is the complex conjugate of the previously obtained complex pilot tone sub-symbol after phase correction for the cyclic prefix;

obtaining an estimate of a normalized frequency offset $\epsilon$ in accordance with the following equation $$\hat{\varepsilon} = \frac{1}{2\pi\left(1 + \frac{CP}{N}\right)} atan\left(\frac{Im(S(N))}{Re(S(N))}\right)$$

where CP is the duration of the cyclic prefix in samples;

using the normalized frequency offset to calculate the total frequency offset used to adjust the output of the voltage controlled oscillator.

12. A communications system as claimed in claim 1 wherein the receiver adjusts the timing signal in the second mode of operation in accordance with a plurality of operations, the plurality of operations comprising:
    computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot tone sub-symbol obtained after phase correction for the cyclic prefix and J*(n) is the complex conjugate of the previously obtained complex pilot tone sub-symbol after phase correction for the cyclic prefix;

obtaining an estimate of a normalized frequency offset $\hat{\epsilon}$ in accordance with the following equation $$\hat{\varepsilon} = \frac{1}{2\pi} atan\left(\frac{Im(S(N))}{Re(S(N))}\right)$$

using the normalized frequency offset to calculate the total frequency offset used to adjust the output of the voltage controlled oscillator.

13. A communications system comprising:
    a transmitter for transmitting OFDM/DMT symbols over a predetermined number of bins across a transmission medium, the OFDM/DMT symbols being generated using a timing clock signal, at least one of the predetermined number of bins including a pilot tone sub-symbol having a frequency corresponding to the timing clock signal; and a receiver for receiving the OFDM/DMT symbols from the transmission medium, the receiver comprising:

a demodulator for receiving the OFDM/DMT symbols at a selectable reception frequency determined by a frequency control signal and for converting received OFDM/DMT symbols to digital data samples in accordance with a sampling clock signal, the sampling clock signal having a frequency that is responsive to a sampling clock control signal; and a controller circuit including a first output signal connected to provide the frequency control signal to the demodulator circuit and a second output signal connected to provide the clock control signal to the demodulator, the controller including a first pilot tone acquisition mode of operation in which the clock controller (i) directs the demodulator to scan at least a portion of the plurality of bins by varying the frequency control signal to the demodulator, (ii) uses the digital data samples from the demodulator to identify which of the plurality of bins includes the pilot tone by identifying a known spectral pattern, the controller further including a second pilot tone acquisition mode in which the controller (i) provides a frequency control signal to the demodulator to direct the demodulator to receive the bin including the pilot tone as identified in the first pilot tone search mode, and (ii) uses the digital data samples from the demodulator to provide a frequency control signal to the demodulator so that the demodulator receives the bin containing the pilot tone within a frequency range sufficient for subsequent phase locked loop processing of the pilot tone whereby the frequency and phase of the sampling clock signal of the receiver is responsive to the phase locked loop processing to thereby synchronize the sampling clock of the receiver with the timing clock signal of the transmitter.

14. A communications system as claimed in claim 13 wherein the demodulator comprises:

a voltage controlled oscillator responsive to the frequency control signal, the voltage controlled oscillator having an output signal of variable frequency that is adjustable in response to the frequency control signal; and a frequency synthesizer responsive to the output signal of the voltage controlled oscillator for generating a demodulating carrier signal that determines the selectable reception frequency.

15. A communications system as claimed in claim 13 wherein the demodulator comprises:

a voltage controlled oscillator responsive to the sampling clock control signal, the voltage controlled oscillator having an output signal of variable frequency that is adjustable in response to the sampling clock control signal; and a sampling clock signal generator for generating the sampling clock in response to the output signal of the voltage controlled oscillator.

16. A communications system as claimed in claim 13 wherein the demodulator comprises:

a voltage controlled oscillator responsive to the frequency control signal, the voltage controlled oscillator having an output signal of variable frequency in response to the frequency control signal;

a frequency synthesizer responsive to the output signal of the voltage controlled oscillator for generating a demodulating signal that determines the selectable reception frequency;

a clock signal generator for generating the sampling clock in response to the output signal of the voltage controlled oscillator; and the sampling clock control signal and the frequency control signal being a common signal.

17. A communications system as claimed in claim 13 wherein the controller uses the digital data samples of the demodulator to compute squared magnitude values to identify the bin containing the pilot tone while in the first pilot tone acquisition mode of operation.

18. A communications system as claimed in claim 13 wherein the controller uses the digital data samples of the demodulator to compute coherency of symbols received in each bin of the at least one portion of the plurality of bins that are scanned during the first pilot tone acquisition mode of operation, the controller rejecting bins having coherency below a predetermined threshold as not including the pilot tone.

19. A communications system as claimed in claim 13 wherein the controller uses the digital data samples of the demodulator to compute excessive coherency of symbols received in each bin having a coherency above the predetermined threshold, the controller rejecting bins having excessive coherency as not including the pilot tone.

20. A communications system as claimed in claim 13 wherein the bin including the pilot tone is disposed proximate a plurality of proximate bins, the bin containing the pilot tone and the plurality of proximate bins defining a predetermined spectral pattern.

21. A communications system as claimed in claim 13 wherein the spectral pattern is symmetric.

22. A communications system as claimed in claim 13 wherein the spectral pattern is asymmetric.

23. A communications system as claimed in claim 13 wherein the controller uses the digital data of the demodulator to calculate phase differences between consecutive pilot tone sub-symbols to adjust the demodulator in the second mode of operation.

24. A communications system as claimed in claim 13 wherein the OFDM/DMT symbols are transmitted in periodically occurring formatted symbol frames, each formatted symbol frame having a cyclic prefix.

25. A communications system as claimed in claim 24 wherein the controller uses digital data samples of the received OFDM/DMT signals to adjust the demodulator in the second mode of operation in accordance with a plurality of operations on the digital data samples, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot symbol obtained after phase correction for the cyclic prefix and J*(n) is the complex conjugate of the previously obtained complex pilot symbol after phase correction for the cyclic prefix;

obtaining an estimate of a normalized frequency offset $\epsilon$ in accordance with the following equation $$\hat{\varepsilon} = \frac{1}{2\pi\left(1 + \frac{CP}{N}\right)} atan\left(\frac{Im(S(N))}{Re(S(N))}\right)$$

where CP is the duration of the cyclic prefix in bins;
using the normalized frequency offset to calculate the total frequency offset used to adjust the output of the voltage controlled oscillator.

26. A communications system as claimed in claim 13 wherein the controller uses digital data samples of the received OFDM/DMT signals to adjust the demodulator in the second mode of operation in accordance with a plurality of operations on the digital data samples, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot symbol obtained after phase correction for the cyclic prefix and J*(n) is the complex conjugate of the previously obtained complex pilot symbol after phase correction for the cyclic prefix;

obtaining an estimate of a normalized frequency offset $\hat{\varepsilon}$ in accordance with the following equation $$\hat{\varepsilon} = \frac{1}{2\pi} atan\left(\frac{Im(S(N))}{Re(S(N))}\right)$$

using the normalized frequency offset to calculate the total frequency offset used to adjust the output of the voltage controlled oscillator.

27. A communications system as claimed in claim 13 wherein the controller comprises a digital signal processor.

28. A communications system comprising:
a transmitter for transmitting OFDM/DMT symbols over a predetermined number of bins across a transmission medium, the OFDM/DMT symbols being generated using at least one timing signal, at least one of the predetermined number of bins including a pilot tone having a frequency corresponding to the sampling clock signal; and
a receiver for receiving the OFDM/DMT symbols from the transmission medium, the receiver demodulating the received symbols using at least one timing signal, the receiver having a first pilot tone search mode of operation in which the receiver adjusts its timing signal to scan the predetermined number of bins looking for the known spectral pattern of the pilot tone and thereby identifies the bin including the pilot tone, the receiver further having a subsequent second pilot tone acquisition mode in which the receiver adjusts its timing signal to receive the identified bin containing the pilot tone and performs a further adjustment of the timing signal so that the pilot tone is received within a frequency range sufficient for subsequent phase locked loop processing thereof.

29. A communications system comprising:
a transmitter for transmitting OFDM/DMT symbols over a predetermined number of bins across a transmission medium, the OFDM/DMT symbols being generated using at least one timing signal, at least one of the predetermined number of bins including a pilot tone sub-symbol having a frequency corresponding to the sampling clock signal, the OFDM/DMT symbols transmitted in periodically occurring formatted symbol frames, each formatted symbol frame having a cyclic prefix; and
a receiver for receiving the OFDM/DMT symbols from the transmission medium, the receiver demodulating the received symbols using at least one timing signal, the receiver having a first pilot tone search mode of operation in which the receiver adjusts its timing signal to scan the frequency range corresponding to the predetermined number of bins looking for the pilot tone sub-symbol and identifies the bin including the pilot tone sub-symbol, the receiver further having a subsequent second pilot tone acquisition mode in which the receiver adjusts its timing signal to receive the identified bin containing the pilot tone sub-symbol and measures phase differences between successive pilot tone sub-symbols to thereby perform a further adjustment of the timing signal so that the pilot tone sub-symbols are received within a frequency range sufficient for subsequent phase locked loop processing thereof.

30. A communication system as claimed in claim 29 wherein the receiver adjusts the timing signal in the second mode of operation in accordance with a plurality of operations, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot tone sub-symbol obtained after phase correction for the cyclic prefix and J*(n) is the complex conjugate of the previously obtained complex pilot tone sub-symbol after phase correction for the cyclic prefix;

obtaining an estimate of a normalized frequency offset $\varepsilon$ in accordance with the following equation $$\hat{\varepsilon} = \frac{1}{2\pi\left(1 + \frac{CP}{N}\right)} atan\left(\frac{Im(S(N))}{Re(S(N))}\right)$$

where CP is the duration of the cyclic prefix in samples; and
using the normalized frequency offset to calculate the total frequency offset used to adjust the output of the voltage controlled oscillator.

31. A communications system comprising:
a transmitter for transmitting OFDM/DMT symbols over a predetermined number of bins across a transmission medium, the OFDM/DMT symbols being generated using at least one timing signal, at least one of the predetermined number of bins including a pilot tone sub-symbol having a frequency corresponding to the sampling clock signal; and
a receiver for receiving the OFDM/DMT symbols from the transmission medium, the receiver demodulating the received symbols using at least one timing signal, the receiver having a first pilot tone search mode of operation in which the receiver adjusts its timing signal to scan the frequency range corresponding to the predetermined number of bins looking for the pilot tone sub-symbol and identifies the bin including the pilot tone sub-symbol, the receiver further having a subsequent second pilot tone acquisition mode in which the receiver adjusts its timing signal to receive the identified bin containing the pilot tone sub-symbol and measures phase differences between successive pilot tone sub-symbols to thereby perform a further adjustment of the timing signal so that the pilot tone sub-symbols are received within a frequency range sufficient for subsequent phase locked loop processing thereof, and wherein the receiver adjusts the timing signal in the second mode of operation in accordance with a plurality of operations, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1) th complex pilot tone sub-symbol obtained after phase correction for the cyclic prefix and J*(n) is the complex conjugate of the previously obtained complex pilot tone sub-symbol after phase correction for the cyclic prefix; and obtaining an estimate of a normalized frequency offset $\epsilon$ in accordance with the following equation $$\hat{\epsilon} = \frac{1}{2\pi} a\tan\left(\frac{Im(S(N))}{Re(S(N))}\right)$$

using the normalized frequency offset to calculate the total frequency offset used to adjust the output of the voltage controlled oscillator.

32. A communication system comprising:
a transmitter for transmitting OFDM/DMT symbols over a predetermined number of bins across a transmission medium, the OFDM/DMT symbols being generated using a timing clock signal, at least one of the predetermined number of bins including a pilot tone sub-symbol having a frequency corresponding to the timing clock signal; and a receiver for receiving the OFDM/DMT symbols from the transmission medium, the receiver comprising:
a demodulator for receiving the OFDM/DMT symbols at a selectable reception frequency determined by a frequency control signal and for converting received OFDM/DMT symbols to digital data samples in accordance with a sampling clock signal, the sampling clock signal having a frequency that is responsive to a sampling clock control signal; and a controller circuit including a first output signal connected to provide the frequency control signal to the demodulator circuit and a second output signal connected to provide the clock control signal to the demodulator, the controller including a first pilot tone acquisition mode of operation in which the clock controller (i) directs the demodulator to scan at least a portion of the plurality of bins by varying the frequency control signal to the demodulator, (ii) uses the digital data samples from the demodulator to identify which of the plurality of bins includes the pilot tone, the controller further including a second pilot tone acquisition mode in which the controller (i) provides a frequency control signal to the demodulator to direct the demodulator to receive the bin including the pilot tone as identified in the first pilot tone search mode, and (ii) uses the digital data samples from the demodulator to calculate phase differences between consecutive pilot tone sub-symbols to provide an adjusted frequency control signal to the demodulator so that the demodulator receives the bin containing the pilot tone within a frequency range sufficient for subsequent phase locked loop processing of the pilot tone whereby the frequency and phase of the sampling clock signal of the receiver is responsive to the phase locked loop processing to thereby synchronize the sampling clock of the receiver with the timing clock signal of the transmitter.

33. A communication system comprising:
a transmitter for transmitting OFDM/DMT symbols over a predetermined number of bins across a transmission medium, the OFDM/DMT symbols being generated using a timing clock signal, at least one of the predetermined number of bins including a pilot tone sub-symbol having a frequency corresponding to the timing clock signal, the OFDM/DMT symbols being transmitted in periodically occurring formatted symbol frames, each formatted symbol frame having a cyclic prefix; and a receiver for receiving the OFDM/DMT symbols from the transmission medium, the receiver comprising:
a demodulator for receiving the OFDM/DMT symbols at a selectable reception frequency determined by a frequency control signal and for converting received OFDM/DMT symbols to digital data samples in accordance with a sampling clock signal, the sampling clock signal having a frequency that is responsive to a sampling clock control signal; and a controller circuit including a first output signal connected to provide the frequency control signal to the demodulator and a second output signal connected to provide the clock control signal to the demodulator, the controller including a first pilot tone acquisition mode of operation in which the clock controller (i) directs the demodulator to scan at least a portion of the plurality of bins by varying the frequency control signal to the demodulator, (ii) uses the digital data samples from the demodulator to identify which of the plurality of bins includes the pilot tone, the controller further including a second pilot tone acquisition mode in which the controller (i) provides a frequency control signal to the demodulator to direct the demodulator to receive the bin including the pilot tone as identified in the first pilot tone search mode, and (ii) uses the digital data samples of the received OFDM/DMT symbols from the demodulator to adjust the frequency control signal to the demodulator in accordance with a plurality of operations on the digital samples, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1)th complex pilot tone sub-symbol obtained after phase correction for the cyclic prefix and J*(n) is the complex conjugate of the previously obtained complex pilot tone sub-symbol after phase correction for the cyclic prefix;

obtaining an estimate of a normalized frequency offset ε in accordance with the following equation $$\hat{\varepsilon} = \frac{1}{2\pi\left(1 + \frac{CP}{N}\right)} a \tan\left(\frac{Im(S(N))}{Re(S(N))}\right)$$

where CP is the duration of the cyclic prefix in bins; and using the normalized frequency offset to calculate the total frequency offset used to adjust the output of the voltage controlled oscillator;

so that the demodulator receives the bin containing the pilot tone within a frequency range sufficient for subsequent phase locked loop processing of the pilot tone whereby the frequency and phase of the sampling clock signal of the receiver is responsive to the phase locked loop processing to thereby synchronize the sampling clock of the receiver with the timing clock signal of the transmitter.

34. A communication system comprising:

a transmitter for transmitting OFDM/DMT symbols over a predetermined number of bins across a transmission medium, the OFDM/DMT symbols being generated using a timing clock signal, at least one of the predetermined number of bins including a pilot tone sub-symbol having a frequency corresponding to the timing clock signal; and a receiver for receiving the OFDM/DMT symbols from the transmission medium, the receiver comprising:

a demodulator for receiving the OFDM/DMT symbols at a selectable reception frequency determined by a frequency control signal and for converting received OFDM/DMT symbols to digital data samples in accordance with a sampling clock signal, the sampling clock signal having a frequency that is responsive to a sampling clock control signal; and a controller circuit including a first output signal connected to provide the frequency control signal to the demodulator circuit and a second output signal connected to provide the clock control signal to the demodulator, the controller including a first pilot tone acquisition mode of operation in which the clock controller (i) directs the demodulator to scan at least a portion of the plurality of bins by varying the frequency control signal to the demodulator, (ii) uses the digital data samples from the demodulator to identify which of the plurality of bins includes the pilot tone, the controller further including a second pilot tone acquisition mode in which the controller (i) provides a frequency control signal to the demodulator to direct the demodulator to receive the bin including the pilot tone as identified in the first pilot tone search mode, and (ii) uses the digital data samples of the received OFDM/DMT signals from the demodulator to adjust the frequency control signal to the demodulator in accordance with a plurality of operations on the digital data samples, the plurality of operations comprising:

computing a sum S(N) of N consecutive pilot tone sub-symbols in accordance with the following equation $$S(N) = \sum_{l=1}^{N} J(l) J*(l-1)$$

where J(n+1) denotes the (n+1) th complex pilot tone sub-symbol obtained after phase correction for the cyclic prefix and J*(n) is the complex conjugate of the previously obtained complex pilot tone sub-symbol after phase correction for the cyclic prefix; and obtaining an estimate of a normalized frequency offset ε in accordance with the following equation $$\hat{\varepsilon} = \frac{1}{2\pi} a \tan\left(\frac{Im(S(N))}{Re(S(N))}\right)$$

using the normalized frequency offset to calculate the total frequency offset used to adjust the output of the voltage controlled oscillator;

so that the demodulator receives the bin containing the pilot tone within a frequency range sufficient for subsequent phase locked loop processing of the pilot tone whereby the frequency and phase of the sampling clock signal of the receiver is responsive to the phase locked loop processing to thereby synchronize the sampling clock of the receiver with the timing clock signal of the transmitter.

35. A communications system comprising:

a transmitter for transmitting OFDM/DMT symbols over a predetermined number of bins across a transmission medium, the OFDM/DMT symbols being generated using at least one timing signal, at least one of the predetermined number of bins including a pilot tone sub-symbol having a frequency corresponding to the sampling clock signal, the timing signal being used for both timing inverse Fourier transform processing and carrier frequency generation in transmitting the OFDM/DMT symbols; and a receiver for receiving the OFDM/DMT symbols from the transmission medium, the receiver demodulating the received symbols using at least one timing signal, the receiver having a first pilot tone search mode of operation in which the receiver adjusts its timing signal to scan the frequency range corresponding to the predetermined number of bins looking for the pilot tone sub-symbol and identifies the bin including the pilot tone sub-symbol, the receiver further having a subsequent second pilot tone acquisition mode in which the receiver adjusts its timing signal to receive the identified bin containing the pilot tone sub-symbol and measures phase differences between successive pilot tone sub-symbols to thereby perform a further adjustment of the timing signal so that the pilot tone sub-symbols are received within a frequency range sufficient for subsequent phase locked loop processing thereof.

36. A communications system comprising:

a transmitter for transmitting OFDM/DMT symbols over a predetermined number of bins across a transmission medium, the OFDM/DMT symbols being generated using at least one timing signal, at least one of the predetermined number of bins including a pilot tone sub-symbol having a frequency corresponding to the sampling clock signal; and a receiver for receiving the OFDM/DMT symbols from the transmission medium, the receiver demodulating the received symbols using at least one timing signal, the timing signal being used for both timing Fourier transform processing and for carrier frequency generation in demodulating the OFDM/DMT symbols, the receiver having a first pilot tone search mode of operation in which the receiver adjusts its timing signal to scan the frequency range corresponding to the predetermined number of bins looking for the pilot tone sub-symbol and identifies the bin including the pilot tone sub-symbol, the receiver further having a subsequent second pilot tone acquisition mode in which the receiver adjusts its timing signal to receive the identified bin containing the pilot tone sub-symbol and measures phase differences between successive pilot tone sub-symbols to thereby perform a further adjustment of the timing signal so that the pilot tone sub-symbols are received within a frequency range sufficient for subsequent phase locked loop processing thereof.

37. A communication system comprising:

a transmitter for transmitting OFDM/DMT symbols over a predetermined number of bins across a transmission medium, the OFDM/DMT symbols being generated using a timing clock signal, at least one of the predetermined number of bins including a pilot tone sub-symbol having a frequency corresponding to the timing clock signal; and a receiver for receiving the OFDM/DMT symbols from the transmission medium, the receiver comprising:

a demodulator for receiving the OFDM/DMT symbols at a selectable reception frequency determined by a frequency control signal and for converting received OFDM/DMT symbols to digital data samples in accordance with a sampling clock signal, the sampling clock signal having a frequency that is responsive to a sampling clock control signal, the demodulator comprising:

a voltage controlled oscillator responsive to the frequency control signal, the voltage controlled oscillator having an output signal of variable frequency in response to the frequency control signal;

a frequency synthesizer responsive to the output signal of the voltage controlled oscillator for generating a demodulating signal that determines the selectable reception frequency; and a clock signal generator for generating the sampling clock signal in response to the output signal of the voltage controlled oscillator;

the sampling clock control signal and the frequency control signal being a common signal; and a controller circuit including a first output signal connected to provide the frequency control signal to the demodulator and a second output signal connected to provide the clock control signal to the demodulator, the controller including a first pilot tone acquisition mode of operation in which the clock controller (i) directs the demodulator to scan at least a portion of the plurality of bins by varying the frequency control signal to the demodulator, (ii) uses the digital data samples from the demodulator to identify which of the plurality of bins includes the pilot tone, the controller further including a second pilot tone acquisition mode in which the controller (i) provides a frequency control signal to the demodulator to direct the demodulator to receive the bin including the pilot tone as identified in the first pilot tone search mode, and (ii) uses the digital data samples from the demodulator to provide a frequency control signal to the demodulator so that the demodulator receives the bin containing the pilot tone within a frequency range sufficient for subsequent phase locked loop processing of the pilot tone whereby the frequency and phase of the sampling clock signal of the receiver is responsive to the phase locked loop processing to thereby synchronize the sampling clock of the receiver with the timing clock signal of the transmitter.

* * * * *

UNITED STATES PATENT AND TRADEMARK OFFICE
CERTIFICATE OF CORRECTION

PATENT NO. : 6,122,246
DATED : September 19, 2000
INVENTOR(S) : Daniel Marchok, et. al.

It is certified that error appears in the above-identified patent and that said Letters Patent is hereby corrected as shown below:

In the Claims section, column 20, Claim 30, line 43, the lower case epsilon symbol "ε" should be a lower case epsilon symbol with a cap "$\hat{\varepsilon}$".

In the Claims section, column 21, Claim 31, line 30, the lower case epsilon symbol "ε" should be a lower case epsilon symbol with a cap "$\hat{\varepsilon}$".

In the Claims section, column 23, Claim 33, line 13, the lower case epsilon symbol "ε" should be a lower case epsilon symbol with a cap "$\hat{\varepsilon}$".

In the Claims section, column 24, Claim 34, line 19, the lower case epsilon symbol "ε" should be a lower case epsilon symbol with a cap "$\hat{\varepsilon}$".

Signed and Sealed this

Twenty-second Day of May, 2001

*Attest:*

NICHOLAS P. GODICI

*Attesting Officer*     *Acting Director of the United States Patent and Trademark Office*